United States Patent Office 3,143,507
Patented Aug. 4, 1964

3,143,507
REACTION PRODUCTS OF PHOSPHORUS THIOIC ACIDS WITH QUINOID COMPOUNDS AND LUBRICANTS CONTAINING SAME
Thomas W. Mastin, Willoughby, George R. Norman, Lyndhurst, and William M. Le Suer, Cleveland, Ohio, assignors to The Lubrizol Corporation, Wickliffe, Ohio, a corporation of Ohio
No Drawing. Filed Aug. 8, 1961, Ser. No. 130,005
10 Claims. (Cl. 252—46.6)

This invention relates as indicated to the reaction of phosphorus thioic acids with quinoid compounds. It also relates to lubricants which contain the products obtained from such reaction.

It is an object of the invention to provide a process for the conversion of phosphorus thioic acids to products of substantially reduced acidity. It is a further object of this invention to provide novel compositions of matter. It is a still further object to provide improved lubricants.

Other objects of the invention will be apparent from the following detailed description thereof.

These objects have been accomplished by the process of converting an organic phosphorus thioic acid selected from the class consisting of phosphorothioic and phosphinothioic acids to products of substantially reduced acidity which comprises reacting such an acid with a quinoid compound.

The above process involves in most cases an exothermic reaction which is initiated readily at room temperature, yet which is not so exothermic as to require expensive accommodations for cooling. Generally it is sufficient merely to add one of the ingredients portionwise to the other, although in some cases, even this requirement is not necessary, and the two reactants may be mixed immediately. The reaction involves equiomolar amounts of the reactant, although an excess of either reactant may be used.

The use of a solvent is beneficial and recommended particularly in those instances in which the reaction is sufficiently exothermic so as to require some attention. Suitable solvents for such instances include for example, mineral oil, petroleum ether, naphtha, dioxane, aliphatic ethers, chloroform, etc. Preferably the solvent is low-boiling so that it may be removed easily from the product mixture. When the reaction product is designed for some particular end use such as for example in crankcase lubricants, a particularly suitable solvent is the base lubricant which is contemplated for use in the ultimate application. Thus where the reaction product is intended for use in a mineral lubricant, the solvent employed in the reaction will generally be the mineral oil of the final crankcase lubricant.

Inasmuch as the reaction of the process is exothermic the temperature of the reaction generally will be within the range of 20–100° C. In some special circumstances, this temperature may be lower or higher, and for the purposes of this invention all normally satisfactory temperatures are contemplated. In some instances for example, it may be desirable to carry out the reaction at a sufficiently low temperature to inhibit the formation of hyproducts which may for one reason or another be undesirable. In other circumstances, it may be desirable to carry out the reaction at a higher temperature say from 100–150° C. so as to remove continuously from the reaction medium, a solvent which is added with one of the reactants. Likewise, a higher reaction temperature may be desirable where it is desired to remove from the reaction medium gaseous or volatile byproducts which may interfere with the desired reaction or which may be undesirable in the final product mixture. Ordinarily, however, temperatures within the range of 20–100° C. are satisfactory.

The phosphorus thioic acid reactant may be either a phosphorodithioic acid indicated by the structural formula

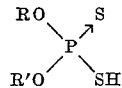

in which R and R' are non-functional organic radicals, or the phosphorus thioic acid reactant may also be a phosphinodithioic acid represented by the structural formula

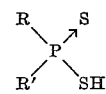

in which R and R' are as defined above. R and R' in each of the above structural formulas may be the same and in most cases are the same, for the purposes of this invention such compounds in which R and R' are dissimilar are also contemplated. With regard to the phosphorodithioic acids which may be used herein, it is preferred to use such compounds having the structural formula above in which R and R' each are attached to the oxygen atoms through a carbon atom, which is attached also only to hydrogen atoms and/or other carbon atoms. Still another desirable type of phosphorusthioic acid reactant is the class of phosphoromonothioic acids such as for example O,O-di-(2-ethylhexyl) phosphoromonothioic acid.

Likewise contemplated for some aspects of the invention is the use in the process of phosphorotrithioic and phosphorotetrathioic acids as reactants with quinoid compounds.

With respect to the identity of R and R' they may include aromatic, aliphatic, and cycloaliphatic radicals. Being non-functional they are comprised for the most part of hydrocarbon radicals, i.e., alkyl, aryl, cycloalkyl, aralkyl, alkaryl, etc. The term "non-functional" however, does not exclude from these radicals the groups halo-, nitro-, ether, ester, etc. The term "non-functional" is used herein to denote radicals which are sufficiently unreactive that they do not take part in, or interfere with, the reaction of the process of this invention. Such radicals, therefore, are not reactive with quinoid compounds in the environment of the herein described process.

Specific illustrative examples of R and R' as contemplated herein include the following: Methyl, ethyl, butyl, hexyl, octyl, decyl, tetradecyl, octadecyl, eicosyl, radicals derived from mixtures of higher molecular weight hydrocarbons such as kerosene, paraffin wax, etc., omega-methoxypropyl, beta-chloroethyl, omega-carbomethoxyethyl, methoxymethyl, beta-phenoxyethyl, cyclohexyl, methylcyclohexyl, hexylcyclohexyl, cyclopentyl, phenyl, p-toyl, p-ethylphenyl, p-chlorophenyl, o-bromophenyl, m-nitrophenyl, xenyl, anisyl, phenetyl, 2,4-dichlorophenyl, beta-phenethyl, alpha-decalyl, amylphenyl, waxphenyl, etc.

The phosphorodithioic acids, useful in the reaction of this process as indicated above, may be prepared by the well-known reaction of phosphorus pentasulfide with alcohols or phenols. Thus the reaction of phosphorus pentasulfide with 2-ethylhexanol yields O,O-di-(2-ethylhexyl) phosphorodithioic acid. Similarly the reaction of phosphorus pentasulfide with phenol yields O,O-diphenyl phosphorodithioic acid.

The phosphinodithioic acid reactant may be prepared by the process disclosed in co-pending application, Serial No. 406,323, filed January 26, 1954, now U.S. Patent 2,797,238, involving the aluminum halide-catalyzed reaction of phosphorus pentasulfide with an aromatic compound. The product of such a reaction is the corresponding aromatic phosphinodithioic acid. Thus the use of benzene in such a reaction results in the formation of diphenyl phosphinodithioic acid. The availability of aliphatic phosphinodithioic acids depends upon the Grignard reaction of alkyl halides with phosphorus pentasulfide to yield the corresponding dialkyl phosphinodithioic acids.

The quinoid compounds which comprise the other reactant of this process include all compounds which contain the structure shown below:

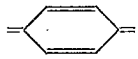

This structure will be recognized as that which characterizes benzoquinone and its derivatives. Such derivatives include not only the substitution products of benzoquinone such as alkylated, chlorinated, etc. benzoquinone, but also such fused ring compounds as naphthoquinone, anthraquinone, and the like. Also included are the substitution products of these fused ring quinones, such as the alkylated naphthoquinones. The characterizing structure shown above is that of 1,4-quinone. For purposes of this invention the 1,2-quinones likewise are contemplated and in some instances they may be preferred for use in the process.

Because of its ready availability and ease of reaction in the process, benzoquinone is preferred.

The products of the herein described process are useful in lubricants, particularly for lubricants intended for use in the crankcases of internal combustion engines. When employed in small concentrations, of the order of 1 or 2%, such products are effective as inhibitors of corrosion. Thus a crankcase lubricant which contains 1% of a product available from the process of this invention is much less corrosive to the metal surfaces of the moving parts of the engine which it lubricates than it would be without the presence of such a product.

Although the preferred concentration in crankcase lubricants of the products of the herein described process lies in the range from about 1% to about 2% by weight of the total lubricant, lower or higher concentrations will also be used depending on the particular type of lubricant desired and the particular service environment in which it is employed.

Ordinarily the concentration range of the products of the herein described process in lubricants will extend from about 0.001% to about 20% by weight of the total lubricant, more often from about 0.1% to about 10%.

In light duty service applications such as those represented by, for example, steam turbine oils, spindle oils, refrigerating machine oils, top cylinder oils, and hydraulic oils, ordinarily from about 0.05% to about 0.5% of the products of the herein described process will suffice.

In intermediate duty service applications such as those represented by, for example, jet aviation oils, automatic transmission oils, compressor oils, gas turbine oils, and the like, ordinarily from about 0.5% to about 3% of the products of the herein described process will be required.

In heavy duty service applications such as those represented by, for example, hypoid gear oils, industrial gear oils, and metal-working oils, the amounts of the products of the herein described process will normally range from about 3% up to about 10% and, in certain very severe service environments, up to about 20% of the total lubricant.

The lubricating oil base selected for the purposes of the present invention can be of synthetic, animal, vegetable, or mineral origin. Ordinarily the mineral oils are preferred by reason of their availability, general excellence, and low cost, although for certain special applications oils belonging to one of the other three groups may be preferred. For instance, synthetic polyester oils such as, for example, didecyl adipate and di-2-ethyl hexyl sebacate, are often preferred for jet engine lubricants.

Normally the lubricating oils preferred for the purposes of the present invention will be fluid oils ranging in viscosity from about 40 Saybolt Universal Seconds at 100° F. to about 200 Saybolt Universal Seconds at 210° F. The invention also extends, however, to gelled oils or greases.

The lubricants of the present invention may also contain known addition agents to supplement the products of the herein described process. Representative examples of auxiliary addition agents which can be employed together with the products of the herein described process for the preparation of improved lubricants include, for example: metal sulfonates such as metal petroleum sulfonates and metal synthetic alkaryl sulfonates; metal salts of phosphorized olefin polymers, i.e., olefin polymers such as polyisobutylene or polyisopropylene which have been treated with at least one phosphorizing agent such as, for example, $PCl_3$, $PSCl_3$, $PCl_3$+sulfur and/or sulfur halide, $PCl_3+H_2S$, phosphorus+sulfur and/or sulfur halide, or a phosphorus sulfide such as $P_2S_5$, $P_4S_7$, $P_4S_3$, and the like; metal phenates such as, for example, calcium wax phenate, metal phenates of alkylphenol-formaldehyde condensation products, metal phenates of alkylphenol sulfides such as, for example, barium phenate of bis-(diisobutyl-phenol) monosulfide or disulfide; metal diorgano phosphorodithioates such as, for example, barium di-(methylcyclohexyl) phosphorodithioate or zinc di-(4-methyl-2-pentyl) phosphorodithioate; phosphorus sulfide treated terpenes, particularly $P_2S_5$-treated turpentine; sulfurized terpenes such as sulfurized dipentene or sulfurized beta-pinene; hindered phenols such as, for example, 2,6-di-tertiary-butyl-4-methyl-phenol; and metal carboxylates of alkylated benzoic or hydroxybenzoic acids such as, for example, the barium or calcium carboxylates of wax-alkylated salicyclic acid. The above-indicated metal salts may be either the normal salts or the so-called basic salts, i.e., those containing a stoichiometric excess of metal. Other conventional addition agents which may be used include, for example, pour point depressants, viscosity index improvers, rust inhibitors, extreme pressure agents, anti-wear agents, dyes, and the like.

The products of this invention are also useful as extreme pressure additives in fuels, especially jet aviation fuels and gas turbine fuels.

The process for reacting a phosphorothioic or phosphinothioic acid with a quinoid compound is illustrated by the following examples:

EXAMPLE 1

To a solution of 428 grams (1.3 moles) of diphenyl phosphinodithioic acid in 500 ml. of benzene was added portionwise 140.4 grams (1.3 moles) of 1,4-benzoquinone in 750 ml. of warm benzene. The benzoquinone was added at such a rate as to maintain the temperature of the resulting reaction mixture at about 50° C. The product mixture was stirred for an additional 1.5 hours at 45–50° C. After all the benzoquinone had been added and then washed with 5% aqueous sodium bicarbonate solution, and after washing with water, the organic residue was extracted with 20% aqueous sodium hydroxide. Acidification of this extract, followed by extraction with benzene and concentration of the benzene extract yielded 425 grams of a pale-yellow, semi-solid, substantially neutral product showing the following analyses:

Percent S _____ 17.2
Percent P _____ 8.6

EXAMPLE 2

A solution of 676 grams (2.1 moles) of di-(2-ethyl-hexyl) phosphinodithioic acid in 525 grams of ethyl ether was treated portionwise so as to control the temperature at about 50° C. with 226 grams (2.1 moles) of 1,4-benzoquinone. When all the benzoquinone had been added, the mixture was stirred for an additional 1.5 hours at 50° C. The product was purified and isolated as in Example 1 to yield a brown, viscous liquid weighing 260 grams. It showed the following analyses:

Percent S _____ 13.0
Percent P _____ 7.3

EXAMPLE 3

To a solution of 93 grams (0.5 mole) of O,O-diethyl-phosphorodithioic acid in 200 ml. of diisopropyl ether there was added at such a rate as to maintain the temperature below 50° C., 54 grams (0.5 mole) of 1,4-benzoquinone. The resulting mixture was stirred at room temperature for an additional 8 hours and filtered. Concentration of the filtrate yielded 142 grams of a dark red, oily, substantially neutral residue having the following analyses:

Percent S _____ 21.5
Percent P _____ 10.0

EXAMPLE 4

To a solution of 354 grams (1.0 mole) of O,O-di-(2-ethylhexyl) phosphorodithioic acid in 500 ml. of naphtha, there was added portionwise so as to maintain the temperature below 50° C. 108 grams (1.0 mole) of 1,4-benzoquinone. The product mixture was heated at 60° C. for an additional 3 hours, then filtered and the filtrate concentrated to 429 grams of a light brown, substantially neutral, oily residue showing the following analyses:

Percent S _____ 14.4
Percent P _____ 6.5

EXAMPLE 5

To a solution of 2000 grams (2.0 moles) of a phosphorodithioic acid prepared by the reaction of phosphorus pentasulfide with a polyisobutyl-substituted (in which the polyisobutyl has an average molecular weight of about 350) phenol in 1000 grams of naphtha, there was added over a period of 12 minutes, 216 grams (2.0 moles) of 1,4-benzoquinone. The rate of addition was such as to maintain the temperature below 70° C. The resulting mixture was heated at 80–90° C. for an additional 3 hours and then filtered at room temperature. The filtrate was concentrated to 2216 grams of a viscous, reddish-brown, substantially neutral liquid having the following analyses:

Percent S _____ 5.5
Percent P _____ 2.7

EXAMPLE 6

A solution of 374 grams (0.15 mole) of a phosphorodithioic acid prepared by the reaction of phosphorus pentasulfide with a polyisobutyl-substituted (in which the polyisobutyl groups have an average molecular weight of about 1000) phenol, in naphtha, was heated to 50° C., then treated portionwise at 50–70° C. over a period of 50 minutes with 16.2 grams (0.15 mole) of 1,4-benzoquinone. The resulting mixture was heated at reflux temperature for an additional 3 hours, then washed successively with 50 grams of water, 50 grams of isopropyl alcohol, 10 grams of aqueous sodium bicarbonate, and finally with 350-gram portions of water. The residue was concentrated to 375 grams of liquid which was filtered to yield 275 grams of a substantially neutral, viscous product with the following analyses:

Percent S _____ 2.7
Percent P _____ 1.2

EXAMPLE 7

To a solution of 423 grams (0.96 mole) of O,O-di(2-ethylhexyl) phosphoromonothioic acid in 500 ml. of naphtha, there was added 104 grams (0.96 mole) of 1,4-benzoquinone. The exothermic reaction caused the temperature to rise to 65° C. and the resulting mixture was heated at reflux temperature for 8 hours. The mixture then was filtered and the filtrate concentrated to a reddish-brown, substantially neutral liquid having the following analyses:

Percent S _____ 6.7
Percent P _____ 7.0

EXAMPLE 8

To a solution of 578 grams (1.0 mole) of di-cetyl phosphorodithioic acid in 1 liter of di-isopropyl ether, there was added slowly 96 grams (0.89 mole) of 1,4-benzoquinone. The temperature of the reaction mixture was maintained below 50° C. by controlling the rate of addition of the quinone. After all of the quinone had been added the reaction mixture was heated at 45–50° C. for 2 hours and then stripped at 60° C./5 mm. Hg to remove the reaction solvent, di-isopropyl ether. The product, the residue remaining in the flask, was a clear, tan, substantially neutral liquid having the following analyses:

Percent S _____ 8.94
Percent P _____ 4.34

The utility of the products of the herein described process as additives for crankcase lubricants was investigated by means of the 36-hour Chevrolet engine test CRC L–4–545 promulgated by the Coordinating Research Council of New York. This test, which is carried out in a Chevrolet 6-cylinder engine of 216.5 cubic inches displacement, is widely recognized in the lubricant industry as a means for measuring the stability of the lubricant towards oxidation and the extent to which a lubricant corrodes sensitive alloy bearings of the copper-lead variety. Table I shows the effectiveness of products of the herein described process in reducing oxidation (reduced oxidation being reflected in a lower viscosity increase), and in reducing the corrosion of the copper-lead bearings.

Table I

| SAE 30 grade solvent extracted Mid-Continent mineral oil containing— | CRC L–4–545 test results | |
|---|---|---|
| | Bearing weight loss in mg. per average whole bearing | Percent viscosity increase of lubricant after test |
| 2% of a product according to Example 8 | 995 | 35.6 |
| 3% of a product according to Example 4 | 155 | 25.9 |
| No additive (control) | 2,821 | 57.7 |

Additional tests were performed to evaluate the utility of a product of a herein described process as an extreme pressure additive for hypoid gear oils. A lubricant compounded from 95.77% of SAE 90 grade low sulfur gear base oil and 4.23% of a product according to Example 4 passed the high speed gear test set forth in Army Ordnance Gear Lubricant Specification AXS–1569. The same gear base oil without the product of Example 4 failed to pass this test.

The products of the herein described process were also found to be effective as oxidation inhibitors for automotive greases. An inhibited grease consisting of 99.5% of a commercial lithium soap grease and 0.5% of a product according to Example 4 showed excellent oxidation stability when tested in the manner set forth in ASTM procedure D–942–50, wherein a sample of the grease is placed in a metal bomb, pressured with oxygen, and then heated at 210° F. for an extended time. The pressure drop versus time is plotted to enable the operator to determine the point (the induction period) at which rapid oxidation of the grease begins. The inhibited grease showed an induction period of 220 hours, whereas the grease which had not been treated with a product of the herein described process showed an induction period of 60 hours.

Additional examples of lubricants containing products of the herein described process are shown in Table II.

Table II

| | Percent by weight |
|---|---|
| SAE 10 mineral oil | 97.5 |
| Barium petroleum sulfonate | 1.0 |
| Sulfurized dipentene | 0.5 |
| Product of Example 2 | 1.0 |
| SAE 20 mineral oil | 95.0 |
| Barium phenate of diisobutyl phenolformaldehyde (2:1 mole ratio) condensation product | 1.0 |
| Basic barium petroleum sulfonate (Example 8 of U.S. Patent 2,695,910) | 2.0 |
| Product of Example 6 | 2.0 |
| SAE 80 mineral oil | 89.5 |
| Chlorinated paraffin wax (40% chlorine) | 2.0 |
| Di-n-hexyl phosphite | 1.0 |
| Product of Example 7 | 7.5 |
| Di-2-ethylhexyl sebacate | 94.5 |
| Tricresyl phosphate | 5.0 |
| Product of Example 5 | 0.5 |
| Spindle oil (viscosity, 50 Saybolt Universal Seconds at 100° F.) | 99.55 |
| 2,6-di-tertiary-butyl-4-methyl-phenol | 0.4 |
| Product of Example 3 | 0.05 |
| SAE 140 mineral oil | 83.0 |
| Di-(chlorobenzyl)disulfide | 1.9 |
| Benzyl thiocyanate | 0.1 |
| Product of Example 4 | 15.0 |
| Castor oil | 99.2 |
| 2,2-bis-(4-hydroxyphenyl)propane | 0.2 |
| Di-n-butyl trisulfide | 0.5 |
| Product of Example 3 | 0.1 |
| SAE 40 mineral oil | 93.0 |
| Barium salt of phosphorized polyisobutylene (Example 1 of U.S. Patent 2,938,894) | 2.0 |
| Commercial VI improver (polymerized alkyl methacrylate) | 3.0 |
| Commercial pour point depressant (wax-alkylated naphthalene) | 0.5 |
| Product of Example 4 | 1.5 |

This application is a continuate-in-part of our application Ser. No. 562,019, filed January 30, 1956, now U.S. Patent No. 3,076,008, which in turn was a continuation-in-part of our application Ser. No. 171,248, filed June 29, 1950 and now abandoned.

Other modes of applying the principle of the invention may be employed, change being made as regards the details described, provided the features stated in any of the following claims or the equivalent of such be employed.

We, therefore, particularly point out and distinctly claim as our invention:

1. A lubricant comprising a major amount of lubricating oil and from about 0.001% to about 20% by weight of a product obtained by the process which comprises reacting an organic phosphorus thioic acid selected from the class consisting of phosphorodithioic, phosphoromonothioic, and phosphinodithioic acids in which the organic groups are selected from the class consisting of hydrocarbon groups and halo-, nitro-, ether-, and ester-substituted hydrocarbon groups with the quinoid ring of a quinone compound.

2. A lubricant in accordance with claim 1 characterized further in that the lubricating oil is a mineral oil.

3. A lubricant in accordance with claim 1 characterized further in that the quinoid compound is a benzoquinone.

4. A lubricant in accordance with claim 1 characterized further in that the quinoid compound is 1,4-benzoquinone.

5. A lubricant in accordance with claim 1 characterized further in that the phosphorus thioic acid is a phosphorodithioic acid having the structural formula

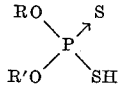

in which R and R' are hydrocarbon radicals.

6. A lubricant in accordance with claim 1 characterized further in that the phosphorus thioic acid is a phosphorodithioic acid having the structural formula

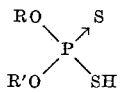

in which R and R' are selected from the class consisting of alkyl and alkylphenyl radicals.

7. A lubricant in accordance with claim 1 characterized further in that the phosphorus thioic acid is an O,O-dialkyl phosphorodithioic acid.

8. A lubricant in accordance with claim 1 characterized further in that the phosphorus thioic acid is O,O-di-(2-ethylhexyl) phosphorodithioic acid.

9. A lubricant in accordance with claim 1 characterized further in that the phosphorus thioic acid is O,O-di-(2-ethylhexyl) phosphorodithioic acid and the quinoid compound is 1,4-benzoquinone.

10. Lubricating oil containing from about 1% to about 2% of the addition product of the compound selected from the group consisting of dialkyl monothio and dialkyl dithio phosphoric acid to the quinoid ring of a quinone compound.

References Cited in the file of this patent

UNITED STATES PATENTS 2,609,379    Ladd et al. _____ Sept. 2, 1952

FOREIGN PATENTS 523,524    Great Britain _____ July 16, 1940